United States Patent
Kalhan et al.

(10) Patent No.: US 11,153,030 B2
(45) Date of Patent: Oct. 19, 2021

(54) LAYERED MODULATION FOR MACHINE TYPE COMMUNICATION (MTC) TRANSMISSIONS

(71) Applicants: Kyocera Corporation, Kyoto (JP); Amit Kalhan, San Diego, CA (US); Henry Chang, San Diego, CA (US)

(72) Inventors: Amit Kalhan, San Diego, CA (US); Henry Chang, San Diego, CA (US)

(73) Assignee: Kyocera Corporation, Kyoto (JP)

(*) Notice: Subject to any disclaimer, the term of this patent is extended or adjusted under 35 U.S.C. 154(b) by 337 days.

(21) Appl. No.: 16/328,643

(22) PCT Filed: Sep. 11, 2017

(86) PCT No.: PCT/US2017/051003
§ 371 (c)(1),
(2) Date: Feb. 26, 2019

(87) PCT Pub. No.: WO2018/049346
PCT Pub. Date: Mar. 15, 2018

(65) Prior Publication Data
US 2021/0175997 A1 Jun. 10, 2021

Related U.S. Application Data

(60) Provisional application No. 62/393,237, filed on Sep. 12, 2016.

(51) Int. Cl.
H04L 1/00 (2006.01)
H04H 20/42 (2008.01)
(Continued)

(52) U.S. Cl.
CPC ........ *H04L 1/0006* (2013.01); *H04H 20/423* (2013.01); *H04L 27/0008* (2013.01); *H04W 24/04* (2013.01); *H04L 27/3488* (2013.01)

(58) Field of Classification Search
CPC ... H04H 20/423; H04L 1/0003; H04L 1/0006; H04L 1/0014; H04L 1/0077;
(Continued)

(56) References Cited

U.S. PATENT DOCUMENTS 7,505,531 B1 3/2009 Pasternak et al.
8,548,079 B2 * 10/2013 Wu ..................... H04L 27/3488
375/261
(Continued)

FOREIGN PATENT DOCUMENTS

WO 2010081760 A1 1/2010
WO 2011-019977 A1 2/2011
WO 2014030501 A1 2/2014

OTHER PUBLICATIONS

Catt, Hierarchical MIMO scheme for LTE-A MBMS, 3GPP TSG RAN WG1 Meeting #56, R1-090947, 3 pages, Feb. 2009.*

Primary Examiner — Frank Duong

(57) ABSTRACT

A base station broadcasts information to machine type communication (MTC) devices in the coverage area of the base station using multiple transmissions with layered modulation. Each transmission includes a different sequence of bits representing the information. A MTC device receiving the signals for the transmissions at a sufficiently high quality can recover the information by using a high modulation order on one of the transmissions. A MTC device receiving the signals of the transmissions at less than the sufficient quality can receive the information by applying a lower modulation order to multiple transmissions.

14 Claims, 3 Drawing Sheets

(51) Int. Cl.
  *H04L 27/00* (2006.01)
  *H04W 24/04* (2009.01)
  *H04L 27/34* (2006.01)

(58) Field of Classification Search
  CPC ... H04L 5/0035; H04L 7/065; H04L 12/1881; H04L 27/0008; H04L 27/3488; H04W 4/70; H04W 24/04; H04W 48/10; H03M 13/25
  See application file for complete search history.

(56) References Cited

U.S. PATENT DOCUMENTS

| | | | | |
|---|---|---|---|---|
| 8,811,253 | B2* | 8/2014 | Damnjanovic | H04W 72/0446 370/312 |
| 10,003,490 | B2* | 6/2018 | Nishimoto | H04L 27/3416 |
| 10,171,989 | B2* | 1/2019 | Bin Sediq | H04L 5/0053 |
| 10,182,317 | B2* | 1/2019 | Li | H04W 72/042 |
| 10,439,758 | B2* | 10/2019 | Park | H04L 1/0041 |
| 2009/0052375 | A1* | 2/2009 | Kalhan | H04L 27/38 370/328 |
| 2009/0052394 | A1* | 2/2009 | Kalhan | H04B 1/16 370/331 |
| 2009/0073917 | A1* | 3/2009 | Anderson | H04L 27/0008 370/316 |
| 2009/0097589 | A1* | 4/2009 | Chen | H04L 27/366 375/295 |
| 2010/0120360 | A1* | 5/2010 | Haustein | H04L 27/3488 455/15 |
| 2010/0232340 | A1* | 9/2010 | Godor | H04L 67/322 370/312 |
| 2010/0284319 | A1* | 11/2010 | Wang | H04W 40/00 370/312 |
| 2012/0106410 | A1 | 5/2012 | Jia et al. | |
| 2014/0198707 | A1* | 7/2014 | Wang | H04W 4/70 370/312 |
| 2014/0269558 | A1 | 9/2014 | Sartori et al. | |
| 2015/0139120 | A1* | 5/2015 | ElArabawy | H04L 27/3488 370/329 |
| 2015/0326360 | A1 | 11/2015 | Malladi et al. | |

* cited by examiner

LAYERED MODULATION FOR MACHINE TYPE COMMUNICATION (MTC) TRANSMISSIONS

CLAIM OF PRIORITY

The present application claims priority to Provisional Application No. 62/393,237, entitled "LAYERED MODULATION FOR NARROWBAND BROADCAST TRANSMISSIONS TO MTC DEVICES", filed Sep. 12, 2016, assigned to the assignee hereof and hereby expressly incorporated by reference in its entirety.

RELATED PATENT APPLICATIONS

The present application is related to PCT Patent Application No. PCT/US2017/051005, entitled "LAYERED MODULATION FOR MACHINE TYPE COMMUNICATION (MTC) TRANSMISSIONS FROM MULTIPLE TRANSCEIVER STATIONS", and PCT Patent Application No. PCT/US2017/051009, entitled "LAYERED MODULATION WITH MULTIPLE CODING RATES FOR MACHINE TYPE COMMUNICATION (MTC) TRANSMISSIONS", both filed concurrently with this application, assigned to the assignee hereof, and hereby expressly incorporated by reference herein.

FIELD

This invention generally relates to wireless communications and more particularly to devices and methods for transmitting information to machine type communication (MTC) devices using layered modulation.

BACKGROUND

Machine type communication (MTC) is a form of data communication which involves one or more entities that do not necessarily need human interaction. Depending on the particular implementation, an MTC device may communicate with one or more servers or with other devices. The network operator provides network connectivity to MTC server(s) regardless of whether the MTC server is controlled by the network operator. An MTC device is typically a user equipment (UE) device that is equipped for Machine Type Communication and communicates through a public land mobile network (PLMN) with MTC Server(s) and/or other MTC Device(s). In some situations, an MTC device might also communicate locally through a hardwired or wireless connection with other entities.

MTC devices are increasingly being used in a variety of applications. Examples of some of the general areas of use include security, tracking, health, payment, remote diagnostics, metering and consumer electronics. Some of the many specific applications include surveillance system control, control of physical access (e.g. to buildings), fleet management, order management, asset tracking, navigation, traffic information, road tolling, point of sales, vending machines, gaming machines, vital signs monitoring, web access telemedicine points, remote maintenance and control of sensors, lighting, pumps, valves, and elevators, vehicle diagnostics, metering of power, gas, water and heating, grid control, and management and control of digital photo frames, cameras and eBooks.

SUMMARY

A base station broadcasts information to machine type communication (MTC) devices in the coverage area of the base station using multiple transmissions with layered modulation. Each transmission includes a different sequence of bits representing the information. A MTC device receiving the signals for the transmissions at a sufficiently high quality can recover the information by using a high modulation order on one of the transmissions. A MTC device receiving the signals of the transmissions at less than the sufficient quality can receive the information by applying a lower modulation order to multiple transmissions.

DETAILED DESCRIPTION

Figure 1:
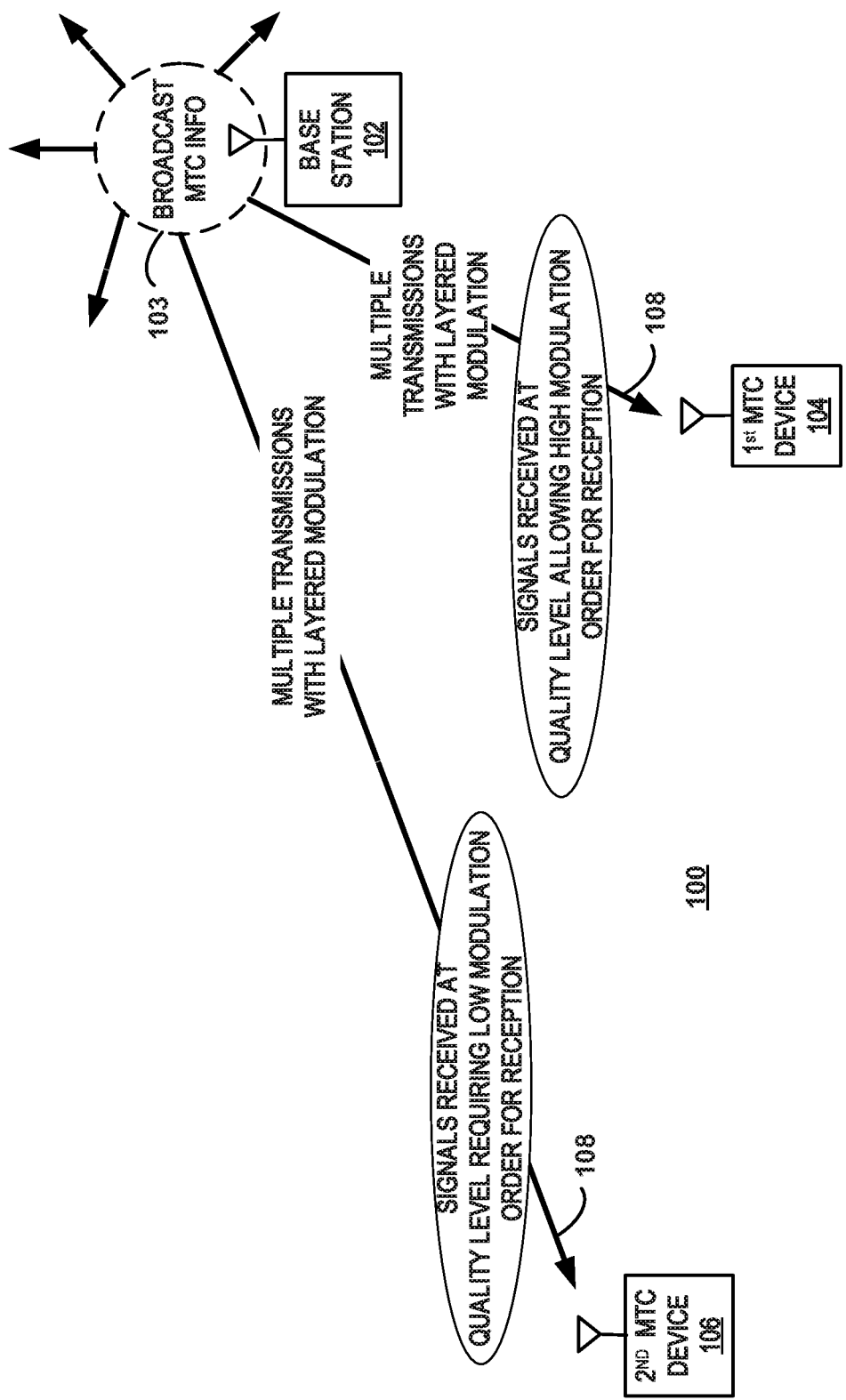
FIG. 1 is a block diagram of a communication system including a base station that broadcasts MTC information to a plurality of MTC devices within a geographic service area such as a cell.

As mentioned above, MTC devices are increasingly being used for numerous applications where the MTC devices exchange information with other devices and servers. The network facilitating communication with the MTC devices must handle the increased traffic due to the numerous MTC devices while accommodating the particular requirements and limitations of the MTC devices. One important consideration includes minimizing the power consumption of the MTC device. As a result, it is advantageous to minimize the time that the MTC device transmits and receives data. In addition, in some situations, it is critical that the information be received uninterrupted at the MTC device. For example, firmware updates should not be interrupted.

Communication systems employ a variety of transmission techniques to maximize efficiency of network resources. One example includes broadcasting information to multiple devices simultaneously rather than establishing a dedicated channel to each of the devices. The same information may be broadcasted from several base stations to devices in multiple service areas. In other situations, however, the information is broadcasted in a single service area or cell. In systems operating in accordance with at least some revisions of The Third Generation Partnership Project (3GPP) Long Term Evolution (LTE) specification, this broadcast is typically referred to as a single cell—point to multipoint (SC-PTM) transmission and is performed using Multimedia Broadcast Multicast Services (MBMS). For SC-PTM transmission of MBMS in accordance with 3GPP specifications, MBMS is transmitted in the coverage of a single cell where one Single Cell-Multicast Control Channel (SC-MCCH) and one or more single cell—multicast traffic channel(s) SC-MTCH(s) are mapped on a Downlink Shared Channel (DL-SCH). For conventional SC-PTM, the base station (eNB) and the core network (CN) schedule the SC-PTM transmissions. In particular, the SC-MCCH and SC-MTCH transmissions are each indicated by a logical channel specific Radio Network Temporary Identifier (RNTI) on the Physical Downlink Shared Channel (PDSCH). There is a one-to-one mapping between Temporary Mobile Group Identity (TMGI) and G-RNTI used for the reception of the DL-SCH to which a SC-MTCH is mapped. As with all existing broadcast mechanisms, including SC-PTM, the broadcast is not guaranteed to reach all UE devices within a cell. With conventional techniques, the broadcast multicast or Single-cell Point-to-Multipoint (SC-PTM) transmissions are designed to meet a target number of UE devices to be able to decode the data packets successfully. In most cases the broadcast transmissions are designed to provide a Block Error Rate less than one percent (BLER<1%) for 95% of the UE devices in the cell.

If higher robustness is needed (e.g., for firmware downloads where none of the data can be dropped for the download to be successful), and if the worst-channel condition information is available (e.g., with Channel State Information (CSI) feedback) then one of the viable solutions is for the base station to transmit the data robust enough to overcome those channel conditions. This may lead to increased use of resources, however, if broadcast data needs to be transmitted at lower MCS (to allow cell edge UEs to receive the broadcast successfully). Alternatively, higher power broadcast transmissions may be used, but resulting in increased interference to neighboring eNBs.

Other approaches for higher broadcast robustness are based on the use of Hybrid Automatic Repeat Request (HARQ) feedback from the receivers which were unable to decode the data successfully. The base station can then apply link-adaptation for the retransmissions. However, several factors need to be considered. If HARQ retransmissions or any type of feedback is needed from the UE it will be necessary for the MTC device to transmit feedback information to the eNB. This is not desirable for MTC devices, since the main criteria for the MTC UE device includes reducing power consumption. However, unlike other non-MTC applications, latency is generally not an issue for MTC UEs. Therefore, solutions for higher robustness could be achieved at the expense of higher latency.

Assuming feedback is not provided to the base station (eNB), it will be necessary for the eNB to decide how the SC-PTM transmissions should be configured. In particular, depending on the intended coverage of the SC-PTM transmissions, the base station (eNB) needs to decide the Modulation and Coding Scheme (MCS) configuration used for the transmissions. With higher MCS, more traffic data can be sent in a shorter duration giving MTC UEs more time to sleep and conserve power, while lower MCS configuration allows better penetration into all coverage areas but at a much lower data rate requirement more power consumption from MTC device.

With conventional techniques, SC-PTM transmission is only transmitted at a particular modulation order, one that will cover up to 90 percent of devices in its cell. Although a lower modulation order may be used to increase the percentage of coverage, devices that can successfully receive the data packet at a higher modulation order will need to stay awake longer since the same data packet will need to be transmitted over multiple transmissions at the lower modulation order. In other words, majority of the devices will suffer (power-consumption-wise) for the benefit of the few devices that cannot receive the packet at the higher modulation order. Under the conventional techniques, a device that cannot receive SC-PTM has the option to obtain the same data packets over Unicast service. However, unicast service is not preferable for a MTC device due to higher power consumption. Furthermore, additional power will be consumed if the MTC device needs to transition to the connected mode to receive the unicast service and the MTC device was originally in the Idle mode (to conserve power). Note that SC-PTM can be received while the MTC device is in the Idle mode. This is also undesirable from a network resource perspective as the main objective of SC-PTM is to be able to broadcast information to many devices that are interested in the same contents without the need to for Unicast delivery. As discussed below, these considerations are addressed by applying layered modulation to broadcasted MTC information with multiple transmissions.

FIG. 1 is a block diagram of a communication system 100 including a base station 102 that broadcasts MTC information 103 to a plurality of MTC devices 104, 106 within a geographic service area such as a cell. The base station 102 may be any type of transceiver station that provides wireless service within a cell and may be referred to as an eNodeB, eNB, and access point, as well as other terms used in the industry. The MTC devices 102, 104 are devices that employ machine type communication (MTC) and are otherwise user equipment (UE) devices operating on the communication system 100. For the examples herein, the communication system 100 operates in accordance with at least one revision of a 3GPP communication specification although the principles and techniques discussed may be applied to other types of systems in some circumstances. The base station 102 broadcasts MTC information 103 within the cell using Multimedia Broadcast Multicast Services (MBMS) techniques for the example. Accordingly, the broadcast transmissions are SC-PTM transmissions. For the example, the MTC information 103 is broadcast in multiple transmissions 108 using layered modulation. As discussed below, each transmission of the multiple transmissions 108 of the MTC information 103 includes a different sequence of bits representing the MTC information 103. The MTC information is directed to multiple MTC devices such as the MTC devices 104, 106. For the example of FIG. 1, two MTC devices 104, 106 are shown although a typical situation may include numerous MTC devices. For the example, a first MTC device 104 receives the signals transmitted from the base station 102 at a first signal quality level and a second MTC device 106 receives the signals transmitted from the base station 102 at second signal quality lower than the first signal quality. The difference in signal quality may be due to a variety of conditions such a noise, signal attenuation, obstacles in the signal path and receiver quality. For example, the first MTC device 104 may be closer to the base station 102 than the second MTC device 106 and may therefore receive signals at a higher quality.

Since each transmission of the multiple transmissions includes all of the MTC information 103 in the example, the MTC information 103 can be recovered with successful demodulation of only one of the transmissions. In order to recover all bits of the MTC information from a single transmission, however, the receiving MTC device must apply a higher modulation order to demodulate the transmission. A lower modulation order can be applied to recover some of the bits of a single transmission. All of the bits of the MTC information 103 can be recovered by demodulating multiple transmissions at the lower modulation order. Generally, using the higher modulation order will require fewer transmissions leading to less processing time than demodulating a higher number of transmissions at a lower modulation order to receive the same information. As a result, using a higher modulation order typically reduces the power consumption of the MTC device because the device spends less time receiving the transmissions and more time in sleep mode or in some other less active state. Although for the example all of the information is transmitted in each transmission, other techniques can be used where the information is received over some number of transmissions where the number of transmissions required to retrieve all of the information is less using higher modulation orders than the number required to receive the information using lower modulation orders.

For the example, the first MTC device 104 receives the multiple transmissions at a sufficiently high quality to use a first modulation order (high modulation order) to recover the MTC information 103. The second MTC device 106, however, receives the multiple transmissions 108 at lower signal quality where the high modulation order cannot be applied to reliably demodulate the transmissions. As a result, the second MTC device 106 applies a second modulation order lower than the high modulation order. The signal quality of the transmissions as received by the second MTC device 106 is sufficiently high to allow the second MTC device to use the second modulation order to demodulate the transmissions 108. The second MTC device 106, however, must demodulate more transmissions than the first MTC device 104 to recover the MTC information 103.

Figure 2:
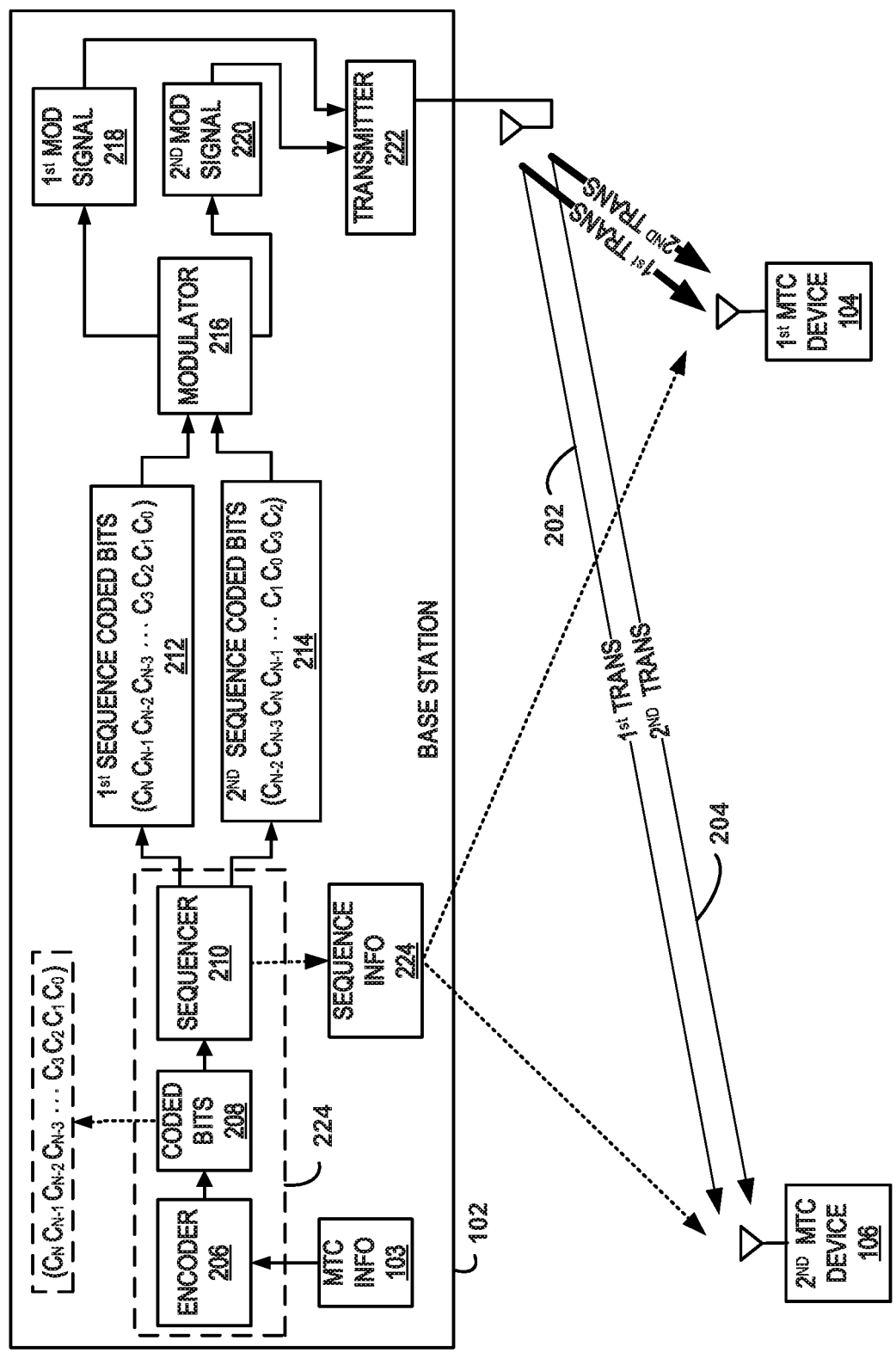
FIG. 2 is a block diagram of the communication system for an example where the multiple transmissions include a first transmission and a second transmission.

FIG. 2 is a block diagram of the communication system 100 for an example where the multiple transmissions 108 include a first transmission 202 and a second transmission 204. For the example, all of the MTC information is included in the first transmission 202 and all of the MTC information is included in the second transmission 204. As discussed below, however, the sequence of bits of the MTC information is different between the two transmissions 202, 204.

The base station 102 in the example encodes and sequences the MTC information into two sequences of coded bits, modulates the two sequences with layered modulation, and transmits each modulated sequence as the first transmission and second transmission 204. The MTC information 103 is intended to reach multiple MTC devices in the service area (cell) of the base station 102 where the signal quality of the signals received at the each MTC device and transmitted from the base station 102 may be different.

An encoder 206 encodes the MTC information 103 into a number of coded bits 208. The resulting coded bits 208 are used to generate two different sequences of coded bits. The sequencer 210 generates a first sequence of coded bits 212 and a second sequence of coded bits 214 based on the MTC information coded bits 208. For the example, the first sequence of coded bits 212 is the same as the sequence of the coded bits 208 and the second sequence of coded bits 214 is the coded bits 208 with each two most significant bits (MSBs) of each set of four coded bits being replaced with the least significant bits (LSBs) of the set. For example, if the coded bits 208 are represented with $C_N$ $C_{N-1}$ $C_{N-2}$ $C_{N-3}$ ... $C_3$ $C_2$ $C_1$ $C_0$, then the first sequence of coded bits 212 is the same and the second sequence of coded bits 214 are represented as $C_{N-2}$ $C_{N-3}$ $C_N$ $C_{N-1}$ ... $C_1$ $C_0$ $C_3$ $C_2$. Numerous other sequencing techniques can be used. In another situation, for example, the second sequence of coded bits 214 may be the reverse of the first sequence of coded bits 212.

The modulator 218 receives the two sequences of coded bits 212, 214 and applies layered modulation to generate two modulated signals 218, 220 that each contains all of the MTC information 103. For the example, the layered modulation includes two modulation orders including a high modulation order and a low modulation order. The terms "high" and "low" are used to designate the relative level of modulation order between the two orders. Therefore, the high modulation order has a higher order than the low modulation order although both can be higher or lower relative to other modulation orders. Examples of suitable modulation orders include quadrature amplitude modulation with different constellation sizes such as 4-QAM and 16-QAM modulation techniques. As is known, 4-QAM is a quadrature amplitude modulation scheme where the data is represented by a single symbol in each of four quadrants of a phase-amplitude representation. For 16-QAM, data is represented by four different symbols in each quadrant. As a result, 16-QAM allows for transmission of more data over time than 4-QAM but requires the receiver to be able to distinguish between smaller differences between phase and amplitude to identify symbols than 4-QAM. Each modulation order requires a minimum signal quality of the received signal at the receiver in order to adequately demodulate the signals and recover the data. Therefore, a received signal must meet a minimum signal quality threshold in order for the receiver to receive a 16-QAM signal. If the signal is transmitted at a higher modulation order while keeping the mean energy the same as the signal transmitted at a lower modulation order, the constellation points of the higher modulation order must be closer together. As a result, assuming the noise and interference level stays the same, it will be more difficult for the receiver to correctly demodulate the signal at higher modulation order.

The first modulated signal 218 and the second modulated signal 220 are transmitted by the transmitter 222 within the service area of the base station 102. The two signals are therefore broadcasted in the cell. As discussed above, MBMS techniques can be used to broadcast the transmissions 202, 204. For the example, the signals are transmitted using SC-PTM techniques in accordance with at least one revision of the 3GPP communication specification but with the additional features discussed herein. In some situations, the two transmissions 202, 204 are transmitted at the same time over two different channels. In the example for FIG. 2, however, the signals are transmitted at different times. In some situations, the signals are transmitted over the same channel at the same time. The traffic channel of SC-PTM is transmitted on PDSCH while the traffic channel for MBMS is transmitted over a MBSFN channel.

The lines representing the transmissions in FIG. 2 are shown with heavier lines to the first MTC device 104 than the lines to the second MTC device 106 to indicate that the signals are being received at a higher quality than at the second MTC device 106. For the example, signal quality of the received transmission at the first MTC device 104 is sufficiently high to allow the first MTC device 104 to demodulate the transmission at the high modulation order (e.g., 16-QAM). The signal quality of the received transmission at the second MTC device 106 is not sufficient to allow the second MTC device 106 to demodulate the transmission at the high modulation order (e.g., 16-QAM). The signal quality, however, is adequate for the second MTC device to demodulate the transmissions at the low modulation order (e.g., 4-QAM). As a result, the first MTC device can recover all of the MTC information 103 by applying the high modulation order to only one of the transmission 202, 204: either the first transmissions 202 or the second transmission 204. The second MTC device 106, however, applies the low modulation order to both transmissions 202, 204 to recover the MTC information 103. As a result, the first MTC device 104 will be in active mode for less time receiving the transmission and will be in sleep mode longer thereby conserving power. As discussed above, this technique allows a greater number of MTC devices in the cell to receive the MTC information while allowing some MTC devices to conserve power by using the high modulation order to receive the MTC information.

In some situations, the sequences of coded bits are predetermined and static. In other circumstances, however, the sequence of the bits in one or more of the transmissions 202, 204, is dynamically changing or otherwise not known by the MTC devices 104, 106. As a result, the base station 102 provides the sequence(s) to the MTC devices. An example of suitable technique includes transmitting the sequence information 224 in a control signal such as a part of the control information provided in the SC-MCCH for SC-PTM and in the MCCH for MBSFN. For the example, the control channels are transmitted at a lower modulation order such that all UE devices are able to obtain the information throughout the cell coverage area. An example of another suitable technique for transmitting the sequence information includes broadcasting the information over a system broadcast message in a semi-static manner.

The technique discussed above can be generalized for layered modulation where the modulation order of the base component is represented by $2^p$ and the modulation order enhanced component is $2^r$. For the generalization, r and p are integers and r is greater than p. For the examples herein, r is also an integer multiple of p although systems can be implemented without this constraint in some circumstances. The number of retransmissions is equal to differences in the exponent of the order of the enhanced modulator and the exponent of the base modulation minus one. Therefore, if $2^p$ is the base modulator order and $2^r$ is the enhanced modulator order, then the number of retransmission is (r−p)/p and the total of number of transmissions (n) is equal to (r−p)/p+1. For example, for the situation where 4-QAM and 16-QAM are used, r is 4 and p is 2 and the number of retransmissions is (4−2)/2=1. The total number of transmissions is equal to (4−2)/2+1=2, n=2. In another example, where the enhanced modulator is 64-QAM and the base modulator is 4-QAM, r=6 and p=2 and the number of retransmissions is (6−2)/2=2.

The various functions and operations of the blocks described with reference to the base station 102 may be implemented in any number of devices, circuits, electronics, code, or elements. Two or more of the functional blocks may be integrated in a single device, and the functions described as performed in any single block may be implemented over several devices. For example, the functions of the encoder 206, and sequencer 210 may be performed by a single signal processing device 224 in some circumstances.

Figure 3:
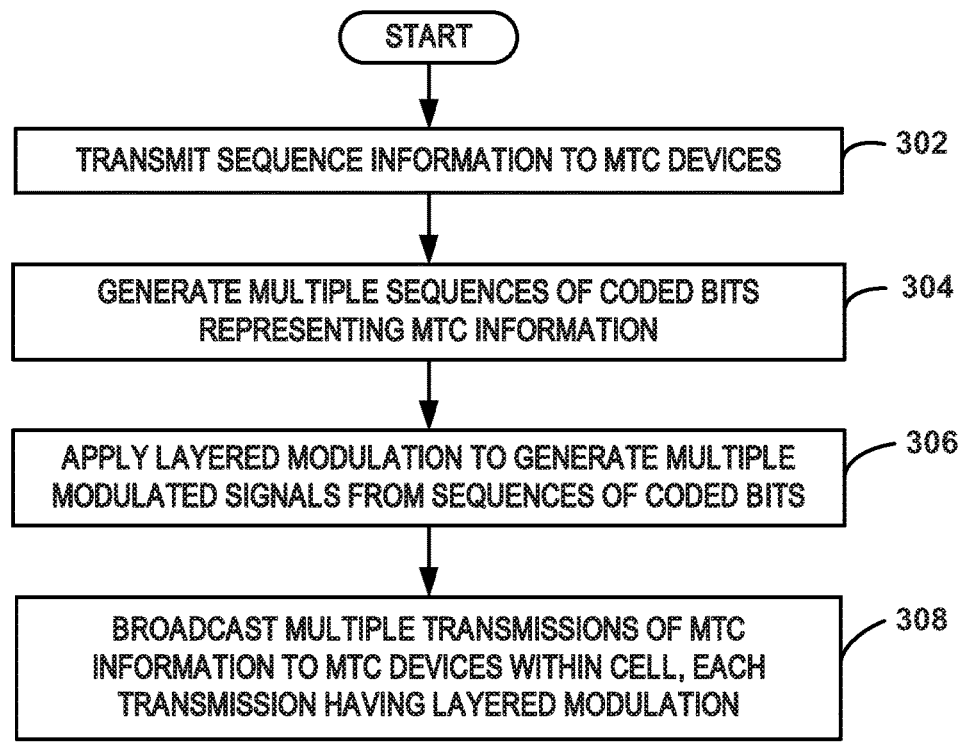
FIG. 3 is a flow chart of an example of a method of broadcasting MTC information within a cell.

FIG. 3 is a flow chart of an example of a method of broadcasting MTC information 103 within a cell. The steps of FIG. 3 can be performed in a different order than shown and some steps may be combined into a single step. Additional steps may be performed and some steps may be omitted. For the example, the method is performed by a base station or eNB such as the base station 102.

At step 302, the sequence information is transmitted to the MTC devices in the cell. The sequence information indicates the sequence order of bits in one or more transmissions. The base station 102 broadcasts the sequence information as control information over SC-MCCH, MCCH, or System information.

At step 304, multiple sequences of coded bits are generated based on the coded bits representing the MTC information. For the example, each sequence of bits represents all the MTC information and is different from the other sequences. As discussed with reference to FIG. 2, an example of a suitable technique includes encoding the bits of the MTC information and generating two sequences of bits from the resulting coded bits. One sequence may be the original sequence of coded bits and the other sequence may include swapping MSBs with LSBs in sets of bits forming the sequence.

At step 306, layered modulation is applied to the multiple sequences of bits to generate multiple modulated signals. For one example, two modulated signals are generated where each modulated signal includes all of the MTC information.

At step 308, the multiple modulated signals are broadcasted within the cell to all of the MTC devices within the cell. The multiple transmissions allow a first MTC device receiving the multiple transmissions at a first signal quality to recover the MTC information using a high modulation order and allow a second MTC device receiving the transmissions at a lower signal quality to recover the MTC information using a lower modulation order lower than the high modulation order. The first MTC device may demodulate only one of the transmissions to recover the MTC information 103. The second MTC device, however, demodulates multiple transmissions to receive some of the bits from each transmission to recover all of the MTC information bits.

In one scenario, as discussed above, each transmission may include 16-QAM modulation and 4-QAM modulation such that the MTC information is recoverable by the first MTC device by applying 16-QAM demodulation to one of the transmissions and the MTC information is recoverable by the second MTC device by applying 4-QAM to both transmissions.

Figure 4:
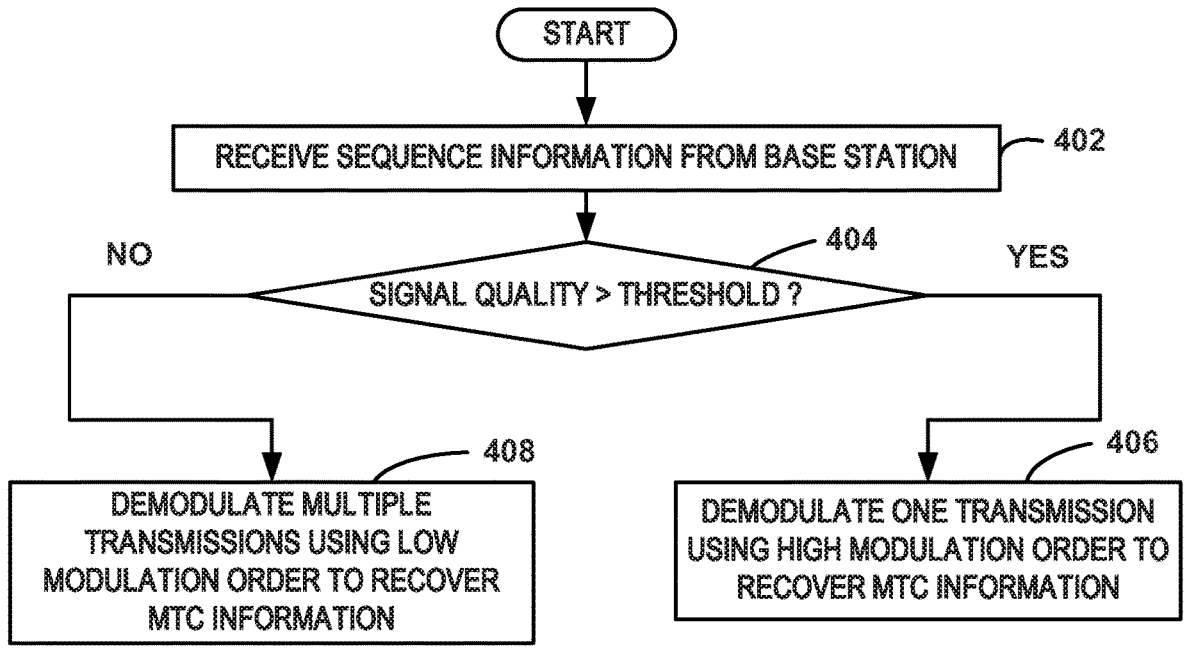
FIG. 4 is a flow chart of a method of receiving MTC information at a MTC device.

FIG. 4 is a flow chart of a method of receiving MTC information at a MTC device. The steps of FIG. 4 can be performed in a different order than shown and some steps may be combined into a single step. Additional steps may be performed and some steps may be omitted. For the example, the method is performed by a MTC UE device such as the MTC device 104 or the MTC device 106.

At step 402, sequence information is received from the base station 102.

At step 404, it is determined where the signal quality of signals received from the base station 102 are above a threshold. The threshold is the minimum quality that allows the MTC device to successfully demodulate the transmission 202, 204 using the high modulation order. The threshold may be, or may be based on any combination of a signal to noise ratio (SNR), signal-to-noise-plus-interference ratio (SNIR). Reference Signal Received Quality (RSRQ) Reference Signal Received Power (RSRP) or any other suitable parameter that allows the MTC device to determine if the higher modulation order can be used.

If the signal quality is above the threshold, the method continues at step 406 where one of the transmissions containing the MTC information is demodulated using the high modulation order (e.g., 16-QAM). Otherwise, the method continues at step 408 where multiple transmissions are demodulated using the low modulation order to recover the MTC information. When using the lower modulation order, the MTC device retrieves some of the coded bits from each of the transmissions and then combines the bits to recover the MTC information.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
   transmitting sequence information indicating a scrambling sequence of coded bits in at least one transmission of multiple transmissions; and
   broadcasting machine type communication (MTC) information in the multiple transmissions using layered modulation such that a first MTC device receiving the multiple transmissions at a first signal quality can recover the MTC information using a high modulation order and such that a second MTC device receiving the transmissions at a lower signal quality can recover the MTC information using a lower modulation order lower than the high modulation order.

2. The method of claim 1, wherein the transmitting the sequence information comprises transmitting the sequence information as control information within at least one of a Multicast Control Channel (MCCH), a Single Cell Multicast Control Channel (SC-MCCH) and System Information.

3. The method of claim 1, wherein the broadcasting comprises:
   broadcasting the MTC information in n transmissions, each transmission having a different sequence of bits, the MTC information recoverable by the first MTC device by demodulating only one of the n transmissions, the MTC information recoverable by the second MTC device by demodulating each of the n transmissions to obtain some of the sequence of coded bits in each transmission, where r and p are integers, r is greater than p, and n=(r−p)/2+1.

4. The method of claim 3, wherein the broadcasting comprises:
   broadcasting the MTC information in a first transmission with a first sequence of coded bits;
   broadcasting the MTC information in a second transmission with a second sequence of coded bits, the MTC information recoverable by the first MTC device by demodulating only one of the first transmission and the second transmission, the MTC information recoverable by the second MTC device by demodulating the first transmission to obtain some of the first sequence of coded bits and demodulating the second transmission to obtain some of the second sequence of coded bits.

5. The method of claim 4 wherein the broadcasting the MTC information comprises transmitting the first sequence of coded bits and second sequence of coded bits at 16 point quadrature amplitude modulation (16-QAM), the MTC information is recoverable by the first MTC device by applying 16-QAM demodulation to one of the transmissions, the MTC information recoverable by the second MTC device by applying 4-QAM to both transmissions.

6. The method of claim 4, wherein the second sequence of coded bits is the first sequence of coded bits with most significant bits swapped with least significant bits in each set of a number of bits.

7. The method of claim 6, wherein the second sequence of coded bits is the first sequence of coded bits with a first most significant bit swapped with a first least significant bit and a second most significant bit is swapped with a second least significant bit in each set of four bits.

8. The method of claim 4, wherein the broadcasting the MTC information in the first transmission comprises transmitting the MTC information in a first Single Cell Point-To-Multipoint (SC-PTM) transmission and broadcasting the MTC information in the second transmission comprises transmitting the MTC information in a second SC-PTM transmission.

9. The method of claim 4, wherein the first transmission and the second transmission are transmitted at the same time on different channels.

10. The method of claim 4, wherein the first transmission and the second transmission are transmitted at different times on the same channel.

11. A base station comprising:
    an encoder configured to code machine type communication (MTC) information to generate a plurality of coded bits;
    a sequencer configured to generate, based on the plurality of coded bits, a first sequence of bits and a second sequence of bits having a different sequence from the first sequence of bits;
    a modulator configured to modulate the first sequence of bits using layered modulation to generate a first modulated signal and to modulate the second sequence of bits using layered modulation to generate a second modulated signal;
    transmitter configured to:
       transmit the first modulated signal and the second modulated signal such that a first MTC device receiving the first modulated signal at a first signal quality can recover the MTC information using a high modulation order and such that a second MTC device receiving the first modulated signal and the second modulated signal at a second signal quality lower than the first signal quality can recover the MTC information using a lower modulation order lower than the high modulation order, and
       transmit sequence information indicating a scrambling sequence of coded bits of at least one of the transmissions.

12. The base station of claim 11, wherein the second sequence of coded bits is the first sequence of coded bits with most significant bits swapped with least significant bits in each set of a number of bits.

13. The base station of claim 11, wherein the transmitter is configured to:
    broadcast the MTC information in a first transmission with a first sequence of coded bits;
    broadcast the MTC information in a second transmission with a second sequence of coded bits, the MTC information recoverable by the first MTC device by demodulating only one of the first transmission and the second transmission, the MTC information recoverable by the second MTC device by demodulating the first transmission to obtain some of the first sequence of coded bits and demodulating the second transmission to obtain some of the second sequence of coded bits.

14. The base station of claim 11, wherein the transmitter is configured to broadcast the MTC information by transmitting the first sequence of coded bits and second sequence of coded bits at 16 point quadrature amplitude modulation (16-QAM), the MTC information is recoverable by the first MTC device by applying 16-QAM demodulation to one of the transmissions, the MTC information recoverable by the second MTC device by applying 4-QAM to both transmissions.

* * * * *